United States Patent
Thimmegowda et al.

(10) Patent No.: US 10,528,030 B2
(45) Date of Patent: Jan. 7, 2020

(54) CASTING MACHINE STOCK VERIFICATION METHODS AND SYSTEMS

(71) Applicant: HONEYWELL INTERNATIONAL INC., Morris Plains, NJ (US)

(72) Inventors: Kiran Kumar Thimmegowda, Karnataka (IN); Raghavendra Gattu, Karnataka (IN); Karthik Ananthakrishna, Karnataka (IN); Sujai S, Tamil Nadu (IN); Raghavendra Koneri, Mysore (IN)

(73) Assignee: GARRETT TRANSPORTATION I INC., Torrance, CA (US)

( * ) Notice: Subject to any disclaimer, the term of this patent is extended or adjusted under 35 U.S.C. 154(b) by 641 days.

(21) Appl. No.: 15/181,154

(22) Filed: Jun. 13, 2016

(65) Prior Publication Data

US 2017/0357244 A1 Dec. 14, 2017

(51) Int. Cl.
*G05B 19/40* (2006.01)
*G05B 19/4097* (2006.01)
*B22D 45/00* (2006.01)
*B22D 46/00* (2006.01)

(52) U.S. Cl.
CPC ......... *G05B 19/4097* (2013.01); *B22D 45/00* (2013.01); *B22D 46/00* (2013.01); *G05B 2219/35134* (2013.01); *G06F 2217/12* (2013.01)

(58) Field of Classification Search
CPC ...... G05B 19/4097; G05B 2219/35134; B22D 45/00; B22D 46/00; G06F 17/50; G06F 17/5086; G06F 2217/12; G06F 2217/41; Y02P 90/265

USPC .......................................................... 703/1
See application file for complete search history.

(56) References Cited

U.S. PATENT DOCUMENTS 7,997,956 B2  8/2011  Tsuruzoe et al.
8,652,374 B2  2/2014  Kaneuchi et al.

FOREIGN PATENT DOCUMENTS

WO  2010036801 A2  4/2010

OTHER PUBLICATIONS

GoEngineer_2013 (Solidworks 2013—Find the Center of Gravity downloaded from YouTube: https://www.youtube.com/watch?v=V2d59gZp0K0).*
JISB0031_1994 ( Technical Data Surface Roughness JIS B 0601 1994 Methods of Indicating Surfaces in Drawings).*

(Continued)

*Primary Examiner* — Brian S Cook
(74) *Attorney, Agent, or Firm* — Lorenz & Kopf, LLP

(57) ABSTRACT

Systems and methods are provided for designing casting and finished component models used to fabricate corresponding casting hardware for a casted component and mechanical components fabricated therefrom. One exemplary method involves identifying a first subset of machined casting surfaces in a casting model of the casted component, identifying a second subset of machined feature surfaces in a finished model of the mechanical component, determining respective machine stock values associated the machined feature surfaces based on distances between the respective machined feature surfaces and the machined casting surfaces, and providing graphical indicia of the respective machine stock values that are influenced by the relationship between the respective machine stock values and a machine stock threshold.

17 Claims, 5 Drawing Sheets

(56) References Cited

OTHER PUBLICATIONS

TFMTraining_2015 ( TFM—Mastercam X8 3D HST—Stock Model Comparison donloaded from YouTube https://www.youtube.com/watch?v=cVEE1gCTypQ uploaded to the web on Feb. 20, 2015). (Year: 2015).*

HydroComp_2016 (Design of Patterns with PropCad Premium downloaded from YoutTube Https://yoututbe.com/watch?v=94M7pFXIqfc uploaded to the web on Jun. 10, 2016) (Year: 2016).*

Wang_2010 (Rapid Tooling Guidelines for Sand Casting, Mechanical Engineering Series, Springer Science+Business Media, LLC 2010) (Year: 2010).*

Lantto_2015 (Select All The Elements!, Mar. 16, 2015 downloaded from https://hawkridgesys.com/blog/author/neil-lantto). (Year: 2015).*

GoEngineer_2013 (Solidworks 2013—Find the Center of Gravity downloaded from YouTube: https://www.youtube.com/watch?v=V2d59gZp0K0). (Year: 2013).*

JISB0031_1994 ( Technical Data Surface Roughness JIS B 0601 1994 Methods of Indicating Surfaces in Drawings). (Year: 1994).*

Design Of Patterns, with ProCad Premium; Retrieved from Internet on Nov. 20, 2017; URL:https://www.youtube.com.

TFM—Mastercam X8 3D Hst-Stock Model Comparison; Retrieved from Internet on Nov. 20, 2017; URL:https://youtube.com.

Extended EP Search Report for Application No. 17174868.4-1954/3258402 dated Dec. 12, 2017.

European Patent and Trademark Office, Communication 94(3) Examination Report for Application No. 17174868.4, dated Oct. 4, 2018.

\* cited by examiner

CASTING MACHINE STOCK VERIFICATION METHODS AND SYSTEMS

TECHNICAL FIELD

The subject matter described herein relates generally to fabricating mechanical components from a casted component, and more particularly, to verifying casting hardware provides sufficient machine stock prior to fabrication.

BACKGROUND

Many mechanical devices are often constructed using a number of mechanical components which are combined and configured to obtain the resultant mechanical device. Often, one or more mechanical components may be machined from a component created using a cast, mold, or similar hardware. Thus, to fabricate a newly designed mechanical component, new casting hardware often needs to be created for purposes of obtaining a casted component capable of being machined into the designed mechanical component. Due to manufacturability rules or requirements (e.g., based on design for manufacturability (DFM) principles), the casted component may also require some excess material, or machine stock, in various locations to facilitate machining. That said, a cast that provides more excess material than needed undesirably increases material costs. At the same time, creating casting hardware that does not provide sufficient material and does not satisfy manufacturability requirements represents a sunk cost. Thus, designers often devote an undesirable amount of time to ensuring the casting hardware will achieve sufficient machine stock while minimizing material costs. However, the efficacy of the manual optimization of the casting hardware will vary depending on the skill and experience of the designer, while also being prone to human error. Accordingly, it is desirable to provide a means for designing and creating casting hardware that satisfies design for manufacturability objectives in a reliable and efficient manner.

BRIEF SUMMARY

Systems and methods for designing mechanical components and corresponding casting hardware are provided. One exemplary method of designing casting hardware for fabricating a casted component for a mechanical component involves identifying a first subset of machined casting surfaces in a casting model of the casted component and identifying a second subset of machined feature surfaces in a finished model of the mechanical component. For each machined feature surface, a respective machine stock value associated therewith is determined based on a distance between the respective machined feature surface and one or more of the machined casting surfaces of the first subset. The method continues by providing graphical indicia of the respective machine stock values, wherein the graphical indicia are influenced by a machine stock threshold.

In another embodiment, a system is provided that includes a display device, a data storage element, and a processing system. The data storage element stores a finished model of a mechanical component and a casting model of model of a casted component for fabricating the mechanical component. The processing system is coupled to the data storage element and the display device to identify a first subset of machined casting surfaces in the casting model, identify a second subset of machined feature surfaces in the finished model, determine respective machine stock values associated with each machined feature surface of the second subset based on a distance between the respective machined feature surface of the second subset and one or more machined casting surfaces of the first subset, and provide graphical indicia of one or more of the respective machine stock values on the display device, wherein the graphical indicia are influenced by a relationship between the one or more of the respective machine stock values and a machine stock threshold.

In yet another embodiment, a computer-implemented method of designing casting hardware for fabricating a mechanical component from a casted component formed using the casting hardware is provided. The method involves filtering, by a processing system, a plurality of surfaces of a casting model of the casted component to remove unmodified surfaces, combining the filtered subset of casting surfaces to be machined to obtain a representative casting surface, identifying a plurality of machined surfaces based on differences between a finished model of the mechanical component and the casting model, determining a plurality of stock values associated with respective ones of the plurality of machined surfaces as the respective minimum distances between the respective machined surfaces and the representative casting surface, and providing graphical indicia of the plurality of stock values on a display device. The graphical indicia may be influenced by relationships between the respective stock values and a stock threshold.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein relate to verifying that casting hardware, which will be utilized to fabricate mechanical components from a casted component, will result in sufficient excess material (or "machine stock") in the casted component to comply with any applicable manufacturability rules or requirements for fabricating the mechanical components, or otherwise conform with design for manufacturability (DFM) principles. The model used to create the casting hardware (alternatively referred to herein as the casting model) is analyzed to identify a plurality of surfaces of the casted component, which are then filtered based on a model of the mechanical component to be fabricated (alternatively referred to herein as the finished model) from the casted component to remove any surfaces of the casted component that are not machined, modified, or otherwise altered during fabrication of the mechanical component. The filtered subset of unmodified casting component surfaces are fused or otherwise combined to obtain a representative casting surface. The machined surfaces of the mechanical component are also identified from the finished model of the mechanical component, and each machined surface is analyzed or otherwise compared to the representative casting surface to identify a minimum distance between the respective machined surface and the representative casting surface. The minimum distance between a machined surface and the representative casting surface corresponds to the amount of excess material or machine stock in the casted component with respect to that machined surface. Analyzing all machined surfaces results in a plurality of machine stock values, with each machine stock value being associated with respective machined surfaces.

The machine stock values determined using the representative casting surface are utilized to generate graphical indicia of the amount of machine stock associated with the casted component as well as generate alerts, warnings, or other user notifications based on one or more of the machine stock values. For example, when the machine stock associated with a particular machined surface is less than a threshold amount (e.g., minimum machine stock value dictated by manufacturability requirements, DFM rules, user preferences, or the like), an alert may be generated that notifies a user of a potential problem with the casting component, thereby allowing the design of the casting hardware to be modified to provide sufficient machine stock before the casting hardware is fabricated.

Figure 1:
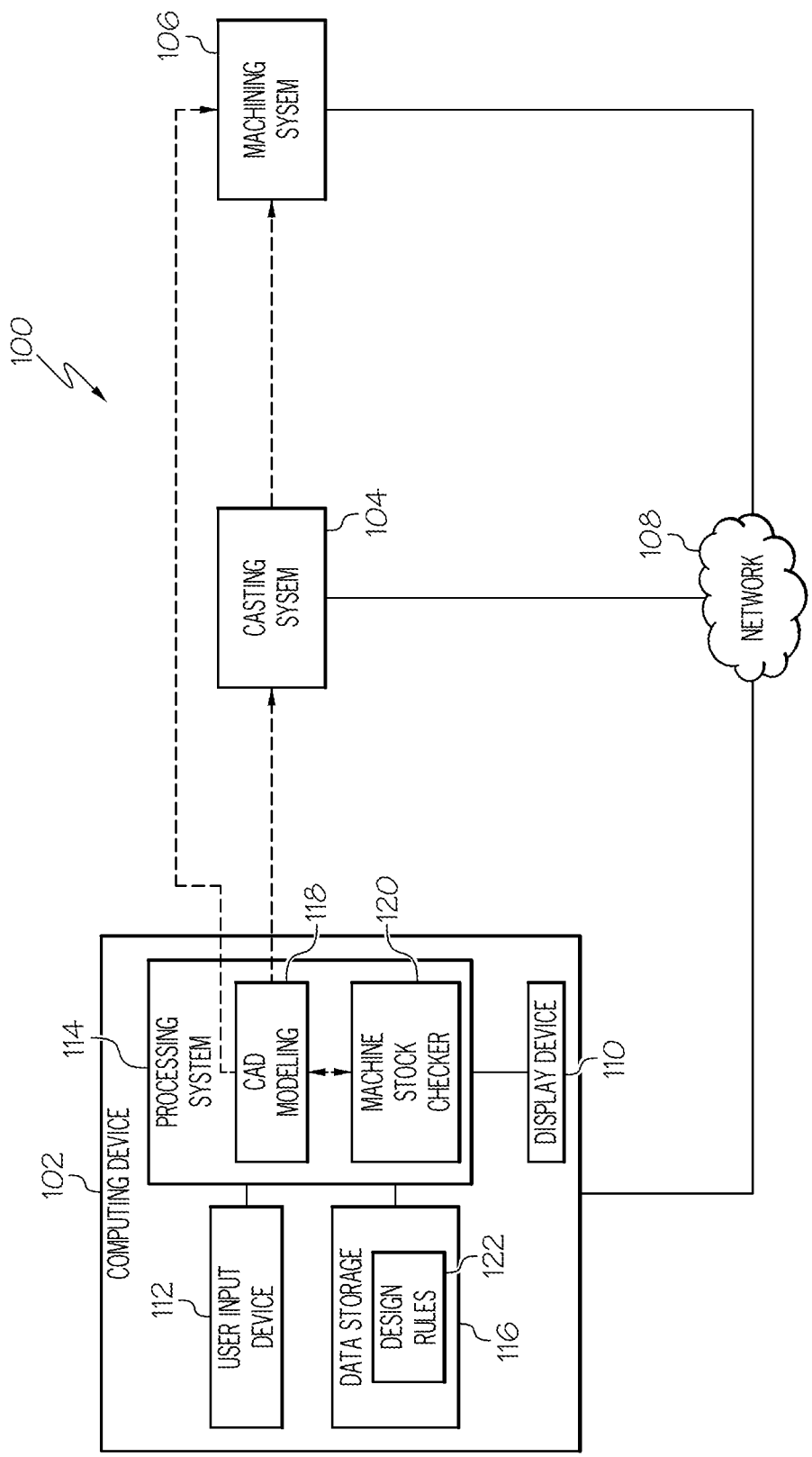
FIG. 1 is a block diagram of a fabrication system in one or more exemplary embodiments.

FIG. 1 depicts an exemplary embodiment of a fabrication system 100 for fabricating a mechanical component from a casted component. The illustrated fabrication system 100 includes a computing device 102 communicatively coupled to a casting system 104 as well as a machining system 106, for example, over a communications network 108. It should be appreciated that FIG. 1 depicts a simplified representation of a fabrication system, and practical embodiments of the fabrication system may include any number or type of different systems or components suitably configured to support the subject matter described herein or otherwise perform conventional fabrication processes and steps beyond the scope of this disclosure. In this regard, while the computing device 102, the casting system 104 and the machining system 106 are depicted as discrete elements, in some embodiments, one or more of the computing device 102, the casting system 104 and the machining system 106 may be integrated with one another.

In the embodiment of FIG. 1, the casting system 104 generally represents the combination of machinery, electronics, computing systems, and other components configured to create, fabricate, or otherwise generate casting hardware (e.g., a mold or the like) based on a casting model received from the computing device 102. The casting hardware is utilized by either the casting system 104 or the machining system 106 to create, fabricate, or otherwise generate casted components corresponding to the casting model, for example, by using the casting hardware to mold, cast, or otherwise form one or more raw materials in the desired shape conforming to the casting model. The machining system 106 generally represents the combination of machinery, electronics, computing systems, and other components configured to perform one or more machining processes on the casted components to fabricate the finished mechanical component corresponding to the finished component model received from the computing device 102.

The computing device 102 generally represents an electronic device that may be utilized by a user to design mechanical components by creating and modifying corresponding casting and finished component models. In exemplary embodiments, the computing device 102 is realized as a personal computer, a desktop computer, a laptop computer, or the like; however, it will be appreciated that the computing device 102 is not necessarily limited to any particular embodiment, and in practice can be realized as any other sort of computer, mobile telephone, tablet or other electronic device configured to support the subject matter described herein. The computing device 102 includes a display device 110, such as a monitor, screen, or another electronic display, capable of graphically presenting data and/or information provided by a processing system 114 along with a user input device 112, such as a keyboard, a mouse, a touchscreen, or the like, that is coupled to the processing system 114 and capable of receiving input data and/or other information from the user of the computing device 102.

The processing system 114 may be implemented using any suitable processing system and/or device, such as, for example, one or more processors, central processing units (CPUs), controllers, microprocessors, microcontrollers, processing cores and/or other hardware computing resources configured to support the operation of the processing system 114 described herein. The processing system 114 may include or otherwise access a data storage element 116 (or memory) capable of storing programming instructions for execution by the processing system 114, that, when read and executed, cause processing system 114 to perform or otherwise support the processes, tasks, operations, and/or functions described herein. Depending on the embodiment, the memory 116 may be realized as a random access memory (RAM), read only memory (ROM), flash memory, magnetic or optical mass storage, or any other suitable non-transitory short or long term data storage or other computer-readable media, and/or any suitable combination thereof. In the illustrated embodiment, the instructions, when read and executed by the processing system 114, cause the processing system 114 to generate or otherwise support a design modeling application 118 and a machine stock checker application 120.

The design modeling application 118 generally represents the component of the computing device 102, such as a computer-aided design (CAD) modeling application, that enables a user to create or otherwise design mechanical components to be fabricated along with the casted components those mechanical components are to be machined from. In this regard, the user may manipulate the user input device 112 to define the dimensions and properties of the finished mechanical component after machining (i.e., the finished component model) as well as the dimensions and properties of the casted component from which that mechanical component is to be fabricated (i.e., the casting model). The casting model for the casted component and the finished component model of the mechanical component may be stored or otherwise maintained in memory 116 in association with one another to facilitate the design analysis process 200 described in greater detail below in the context of FIG. 2.

Still referring to FIG. 1, the machine stock checker application 120 generally represents the component of the computing device 102 that is configured to receive or otherwise obtain the models from the modeling application 118 and/or memory 116 and then analyzes or otherwise assesses the models based on one or more design rules 122, which may be stored in memory 116 or input by a user via the user input device 112 at run-time. In this regard, the machine stock checker application 120 attempts to verify or otherwise confirm that the casted component will provide sufficient machine stock for fabricating the finished mechanical component therefrom. In exemplary embodiments described herein, the machine stock checker application 120 provides graphical indicia of the machine stock values associated with various surfaces of the finished mechanical component, and in some embodiments, generates or otherwise provides user notifications, alerts, or the like when the machine stock value associated with one or more surfaces of the finished mechanical component violates one or more applicable design rules 122, as described in greater detail below. It should be noted that although FIG. 1 depicts the design modeling application 118 and the machine stock checker application 120 as separate components, in practice, the machine stock checker application 120 or the features thereof may be integrated into the design modeling application 118.

Figure 2:
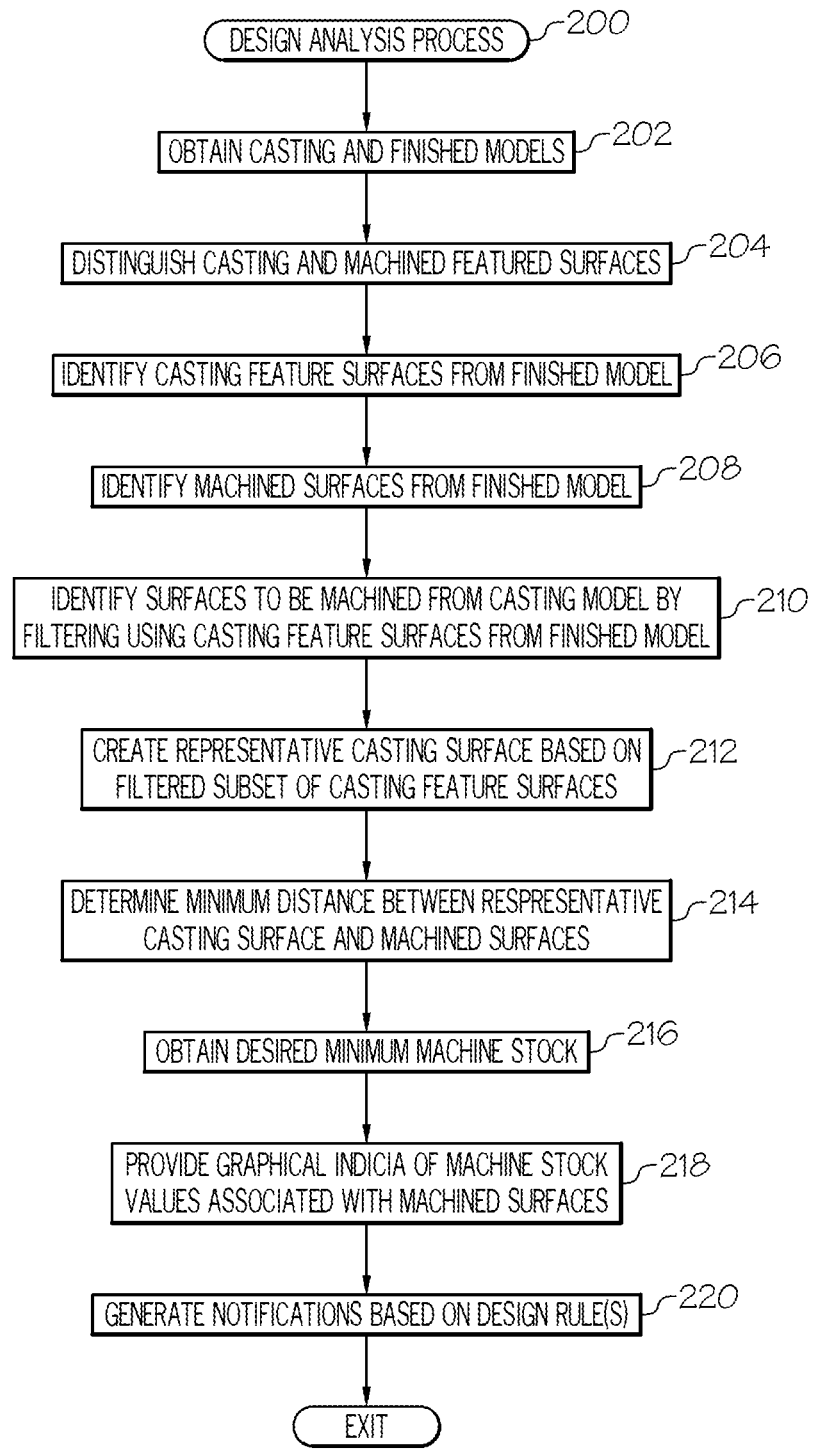
FIG. 2 is a flow diagram of a design analysis process suitable for implementation in conjunction with the fabrication system in accordance with one or more exemplary embodiments.

FIG. 2 depicts an exemplary embodiment of a design analysis process 200 suitable for implementation by a computing device in conjunction with a fabrication system for creating a mechanical component, such as fabrication system 100 of FIG. 1. For illustrative purposes, the following description may refer to elements mentioned above in connection with FIG. 1. In practice, portions of the design analysis process 200 may be performed by different elements of the system 100; however, for purposes of explanation, the subject matter is described herein primarily in the context of the design analysis process 200 being performed by the machine stock checker application 120 of the computing device 102. It should be appreciated that the design analysis process 200 may include any number of additional or alternative tasks, the tasks need not be performed in the illustrated order and/or the tasks may be performed concurrently, and/or the design analysis process 200 may be incorporated into a more comprehensive procedure or process having additional functionality not described in detail herein. Moreover, one or more of the tasks shown and described in the context of FIG. 2 could be omitted from a practical embodiment of the design analysis process 200 as long as the intended overall functionality remains intact.

The design analysis process 200 begins by receiving or otherwise obtaining the casting and finished component models and distinguishing between casting feature surfaces and machined feature surfaces (tasks 202, 204). In this regard, a casting feature surface is an as cast surface of the casted component prior to or absent any machining of the surface after the casting, while a machined feature surface is a machined surface of the finished mechanical component that was machined or otherwise processed after the casting and during fabrication of the mechanical component. In one embodiment, one or more graphical properties of the surfaces of the finished component model are temporarily modified to distinguish machined surfaces from casting surfaces. For example, the machine stock checker application 120 may compare the finished component model to the casting model, and based on similarities and differences between the two, distinguish between casting feature surfaces and machined feature surfaces in the finished component model. The casting feature surfaces in the finished component model (i.e., those having a corresponding surface in the casting model) may be set to a first graphical property (e.g., a green color) and machined feature surfaces in the finished component model may be set to a different graphical property (e.g., a red color), with all feature surfaces in the casting model being set to the same graphical property as the casting feature surfaces in the finished component model.

The design analysis process 200 continues by identifying a first subset of surfaces in the finished component model that are not machined (task 206). In this regard, the first subset of surfaces in the finished component model that are not machined corresponds to the casting feature surfaces that are retained during fabrication and remain unmodified in the finished component. The machine stock checker application 120 iteratively selects or inspects each surface of the finished component model and includes that respective surface in the first subset of surfaces in the finished component model when the surface is not a wireframe surface and has a graphical property corresponding to the casting feature surface graphical property (e.g., green). In other words, wireframe surfaces or those surfaces having a graphical property corresponding to machined feature surfaces (e.g., red) are excluded from the first subset of casting feature surfaces that remain in the finished component.

The design analysis process 200 also identifies a second subset of surfaces in the finished component model that are machined (task 208). In this regard, the machine stock checker application 120 iteratively selects or inspects each surface of the finished component model and includes that respective surface in the first subset of surfaces in the finished component model when the surface is not a wireframe surface and has a graphical property corresponding to the machined feature surface graphical property (e.g., red). Thus, the second subset includes only those machined feature surfaces that are created during fabrication by performing one or more machining processes on a casting feature surface.

In exemplary embodiments, the design analysis process 200 continues by filtering the casting features surfaces in the casting model using the identified first subset of casting feature surfaces that remain in the finished component to obtain a third subset of casting features surfaces in the casting model that are to be machined to fabricate the finished mechanical component (task 210). That is, the third subset of casting features surfaces are those surfaces in the casting model that are subjected to one or more machining processes to obtain one or more of the machined feature surfaces.

In an exemplary embodiment, to filter the casting features surfaces in the casting model, the machine stock checker application 120 initially identifies all casting features surfaces in the casting model (e.g., the green surfaces that are not wireframe surfaces), and for each casting feature surface in the casting model, the machine stock checker application 120 calculates or otherwise determines a representative number associated with that respective surface as a function of the center of gravity of the surface in three-dimensions along with the surface area of the surface. For example, the representative number (n) associated with each casting feature surface in the casting model may be calculated using the equation $n=COG(x)+COG(y)+COG(z)+S^{1/2}$, where COG(x) represents the center of gravity in the x-reference direction for that respective casting feature surface, COG(y) represents the center of gravity in the y-reference direction for that respective casting feature surface, COG(z) represents the center of gravity in the z-reference direction for that respective casting feature surface, and S represents the surface area of that of that respective casting feature surface. This results in an array of representative numbers associated with respective ones of the casting feature surfaces in the casting model. In a similar manner, the machine stock checker application 120 calculates or otherwise determines a representative number associated with each casting feature surface in the identified first subset of casting feature surfaces that remain in the finished component, resulting in another array of representative numbers associated with respective ones of the casting feature surfaces that remain in the finished component model.

Thereafter, for each casting feature surface in the casting model, the machine stock checker application 120 compares its representative number to each of the representative numbers associated with the casting feature surfaces remaining in the finished component. When the representative number associated with a casting feature surface in the casting model matches a representative number associated with a casting feature surface remaining in the finished component, that casting feature surface in the casting model is filtered, removed, or otherwise excluded from further consideration. Thus, those casting feature surfaces having a representative number that matches that of a casting feature surface remaining in the finished component model are filtered, removed, or otherwise excluded from the full set of all casting feature surfaces in the casting model, resulting in a subset of casting feature surfaces which are machined during fabrication, where each casting feature surface remaining in the filtered subset has a unique representative number associated therewith relative to the casting feature surfaces remaining in the finished component. For purposes of explanation, the filtered subset of casting feature surfaces which are machined during fabrication may alternatively be referred to herein as a subset of machined casting surfaces.

Still referring to FIG. 2, the design analysis process 200 determines an amount of machine stock associated with each machined feature surface from the finished component model based on the subset of machined casting surfaces. In this regard, the amount of machine stock associated with an individual machined feature surface from the finished component model corresponds to the minimum distance between that machined feature surface and one of the machined casting surfaces. In the illustrated embodiment, the design analysis process 200 creates a representative surface to be machined by combining the machined casting surfaces into a unitary surface, and then for each machined feature surface, calculates or otherwise determines a minimum distance between that respective machined feature surface and the representative machined casting surface (tasks 212, 214). In this manner, the machine stock checker application 120 determines the minimum distance between each machined feature surface and the representative machined casting surface and stores that minimum distance in association with that respective machined feature surface (e.g., in memory 116). In one or more embodiments, when the minimum distance between a respective machined feature surface and the representative machined casting surface is equal to zero, the machine stock checker application 120 discards the result and instead identifies the next lowest minimum distance between that respective machined feature surface and a respective one of the machined casting surfaces. Thus, when the machined feature surface intersects a machined casting surface, the machine stock checker application 120 excludes that intersecting machined casting surface from consideration when determining machine stock. In other words, the amount of machine stock for that intersected machined feature surface corresponds to the minimum distance between that machined feature surface and the nearest non-intersecting machined casting surface.

After determining machine stock values associated with each machined feature surface in the finished component model, the design analysis process 200 continues by identifying or otherwise obtaining one or more applicable machine stock thresholds and generating or otherwise providing graphical indicia of the machine stock values associated with the machined feature surfaces based on the machine stock threshold(s) (task 216, 218). In one exemplary embodiment, the machine stock checker application 120 receives a desired minimum machine stock value from the user of the computing device 102 via the user input device 112 and provides graphical indicia of the determined machine stock values based on the input minimum machine stock value. In other embodiments, the machine stock checker application 120 identifies or otherwise obtains one or more machine stock threshold values from the stored design rules 122, and provides graphical indicia of the determined machine stock values based on the machine stock threshold value(s) dictated by the design rules 122.

In an exemplary embodiment, the machine stock checker application 120 classifies or otherwise categorizes the machined feature surfaces by comparing the machine stock value associated with each respective machined feature surface to the minimum machine stock value or other applicable machine stock threshold(s). For example, the machine stock checker application 120 may classify or otherwise assign each machined feature surface having an associated machine stock value that is less than the minimum machine stock value to a first category or group containing the machined feature surfaces that have insufficient machine stock associated therewith. Similarly, the machine stock checker application 120 may classify or otherwise assign each machined feature surface having an associated machine stock value that is greater than the minimum machine stock value to a second category or group containing the machined feature surfaces that have excess machine stock associated therewith. Additionally, the machine stock checker application 120 may classify or otherwise assign each machined feature surface having an associated machine stock value that is equal to the minimum machine stock value to a third category or group containing only those machined feature surfaces that have an optimal amount of machine stock associated therewith.

In one or more embodiments, the machine stock checker application 120 generates a graphical user interface (GUI) display that includes graphical representations of the different classifications of machined feature surfaces. For example, the machine stock checker application 120 may generate a pop-up window or similar GUI display that includes a plurality of lists, where each list is associated with a different machine stock classification and includes only information pertaining to machined feature surfaces assigned to that classification.

In other embodiments, the machine stock checker application 120 modifies the graphical properties of the machined feature surfaces in the finished component model in a manner that indicates the machine stock classification associated with the respective machined feature surfaces. For example, machined feature surfaces having associated machine stock values that are less than the minimum machine stock may be rendered in red and machined feature surfaces having associated machine stock values that are greater than the minimum machine stock may be rendered in blue, with the remaining machined feature surfaces having associated machine stock values that are equal to the minimum machine stock being rendered in green.

In one or more embodiments, the design analysis process 200 also generates or otherwise provides one or more user notifications or alerts based on one or more design rules (task 220). In one embodiment, the machine stock checker application 120 generates or otherwise provides one or more notifications or alerts to the user of the computing device 102 based on one or more design rules 122 and the machine stock value associated with one or more machined feature surfaces. For example, the design rules 122 may dictate a minimum machine stock value for fabrication, where the machine stock checker application 120 also generates or otherwise provides a notification or alert to the user (e.g., on the display device 110 or via another output device associated with the computing device 102) that indicates to the user that the mechanical component may be incapable of being fabricated from the casted component based on the current casting model.

Figure 3:
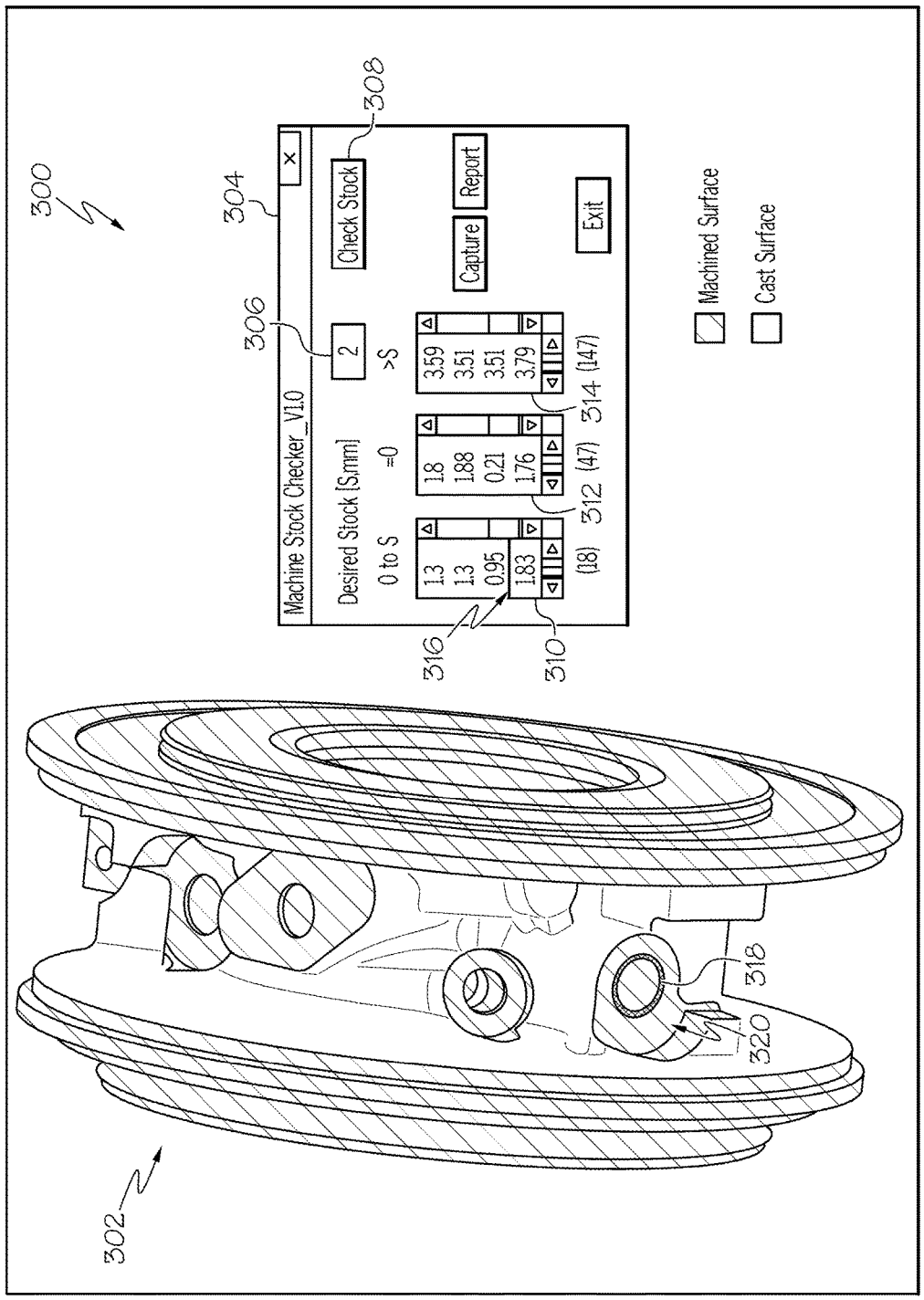
FIG. 3 depicts a graphical user interface (GUI) display capable of being presented on a computing device in the fabrication system of FIG. 1 in conjunction with the design analysis process of FIG. 2 in accordance with one or more exemplary embodiments.

FIG. 3 depicts an exemplary GUI display 300 that may be presented on the computing device 102 in connection with the design analysis process 200 of FIG. 2. The GUI display 300 includes a graphical representation of a finished mechanical component 302 along with an inset GUI display 304 that includes graphical indicia of machine stock values associated with machined feature surfaces of the finished mechanical component 302. In one or more embodiments, the inset GUI display 304 is associated with the machine stock checker application 120. The inset GUI display 304 includes a GUI element 306, such as a text box, that is adapted to receive a minimum machine stock value, which may be input by a user via the user input device 112 or automatically populated by the machine stock checker application 120 based on a minimum machine stock value dictated by a design rule 122. The GUI display 304 also includes a selectable GUI element 308, such as a button, which may be selected or otherwise activated by a user to initiate analysis of the finished mechanical component 302 based on the minimum machine stock value provided in GUI element 306. In this regard, in response to selection of the GUI element 308, the processing system 114 and/or the machine stock checker application 120 may initiate the design analysis process 200 to identify machined casting surfaces from the corresponding casting model and determine the minimum distance between the machined casting surfaces and the machined feature surfaces of the finished mechanical component 302.

As described above, the machined feature surfaces may be classified into one of a plurality of different classes or categories, with graphical indicia of those classifications 310, 312, 314 and the respective machine stock values associated therewith being presented within the GUI display 304. The illustrated GUI display 304 includes list boxes 310, 312, 314 associated with respective machine stock classifications, with a first list box 310 including indicia of the machined feature surfaces having a machine stock value less than the minimum machine stock value represented in the text box 306, a second list box 312 including indicia of the machined feature surfaces that intersect the representative casting surface, and a third list box 314 including indicia of the machined feature surfaces having a machine stock value greater than or equal to the minimum machine stock value represented in the text box 306.

A user may manipulate the user input device 112 to select or otherwise indicate a machined feature surface from within one of the text boxes 310, 312, 314, and in response, the selected machined feature surface may be highlighted or otherwise visually distinguished from the remainder of the mechanical component 302 using a visually distinguishable characteristic. For example, in response to user selection of an identifier 316 associated with a machined feature surface within the low machine stock list box 310, that corresponding machined feature surface 318 may be visually distinguished from the remainder of the mechanical component 302 using a visually distinguishable characteristic that indicates the highlighted surface 318 has insufficient machine stock, for example, by rendering the selected surface 318 in a red color. Similarly, in some embodiments, in response to user selection of a surface 318 of the mechanical component 302, the identifier 316 associated with that selected machined feature surface 318 may be highlighted within the low machine stock list box 310 while also updating the machined feature surface 318 to be visually distinguished from the remainder of the mechanical component 302. Thus, the user may utilize the list box 310 to identify machined feature surfaces and corresponding locations where one or more surfaces of the casting model should be adjusted to increase machine stock with respect to the selected machined feature surface.

In a similar manner, in response to user selection of an identifier associated with a machined feature surface within the intersecting machine stock list box 312, that corresponding machined feature surface may be visually distinguished from the remainder of the mechanical component 302 using a visually distinguishable characteristic that indicates an intersected machined feature surface (e.g., a green color). In this regard, the user may utilize the second list box 312 to identify machined feature surfaces and corresponding locations where one or more surfaces of the casting model are intersected to manually analyze and verify there will be sufficient machine stock to enable fabrication of the selected machined feature surface based on the fabrication processes.

Similarly, user selection of an identifier associated with a machined feature surface within the excess machine stock list box 314 results in that corresponding machined feature surface being visually distinguished a visually distinguishable characteristic that indicates excessive machine stock (e.g., a blue color). Thus, the user may utilize the list box 314 to identify machined feature surfaces and corresponding locations where one or more surfaces of the casting model could potentially be adjusted to decrease machine stock with respect to the selected machined feature surface.

Figure 5:
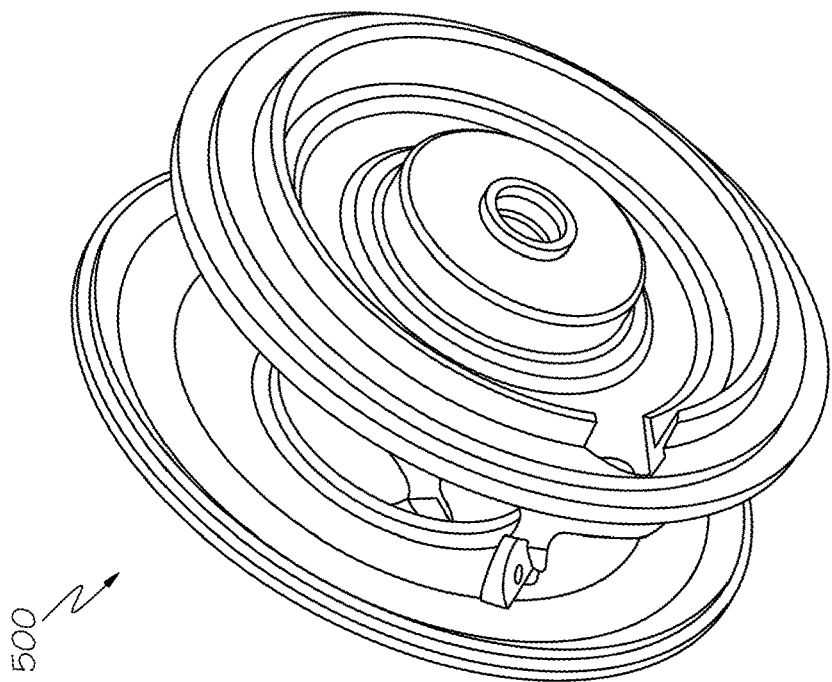
FIG. 5 depicts a perspective view of the mechanical component depicted in the GUI display of FIG. 3 that includes only the machined feature surfaces of the mechanical component in one exemplary embodiment.
Figure 4:
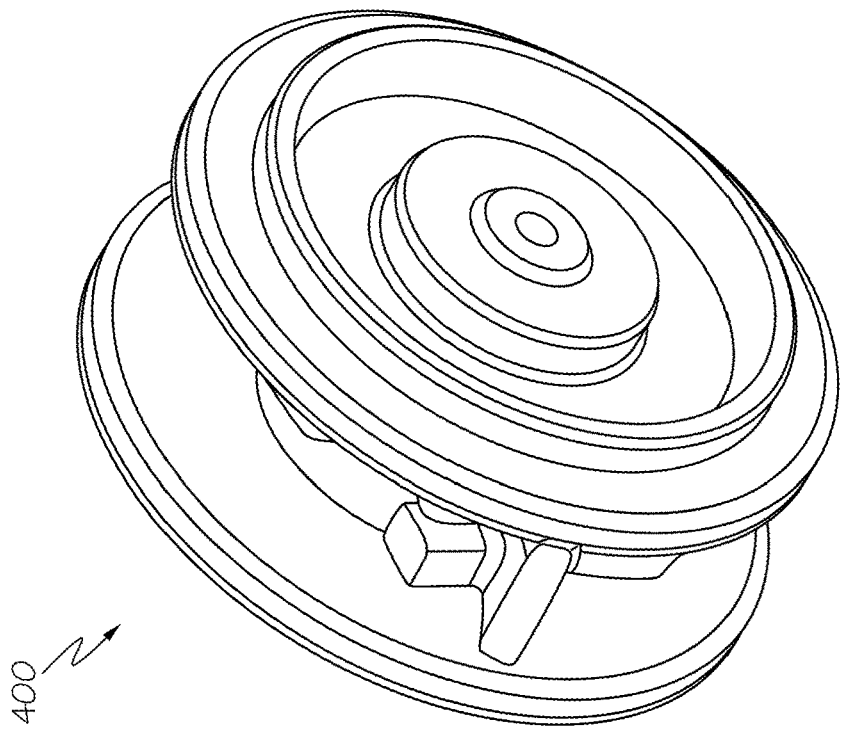
FIG. 4 depicts a perspective view of a casting model for a casted component that the mechanical component depicted in the GUI display of FIG. 3 can be fabricated from in one exemplary embodiment.
Figure 7:
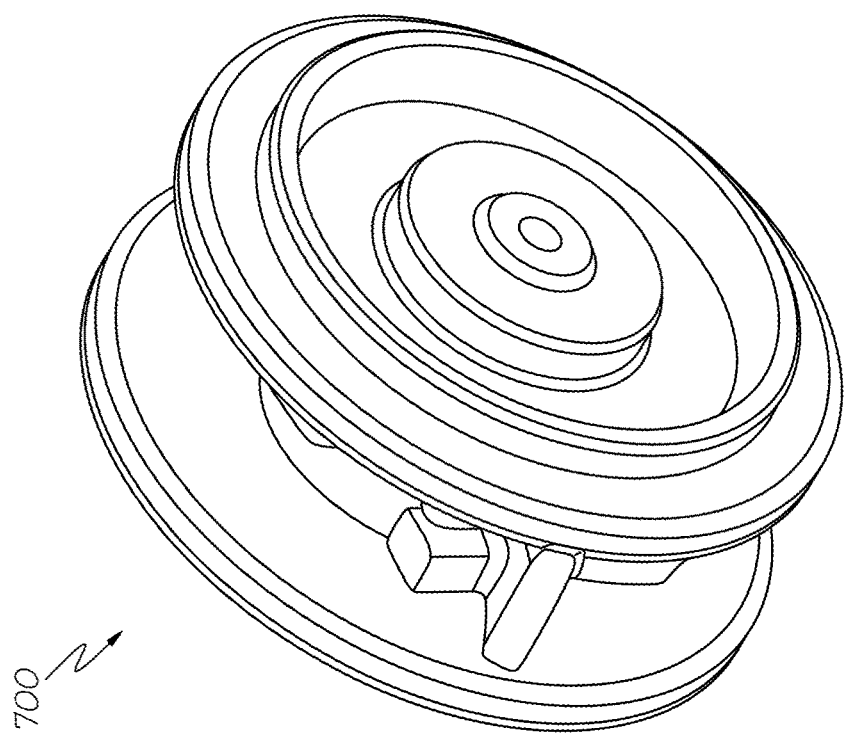
FIG. 7 depicts a perspective view of the casted component of FIG. 4 that includes only those casting feature surfaces that are to be machined to fabricate the machined feature surfaces of the mechanical component depicted in FIG. 5 and which are utilized to create a representative surface for determining machine stock values associated with the machined feature surfaces of FIG. 5 in one exemplary embodiment of the design analysis process of FIG. 2.
Figure 6:
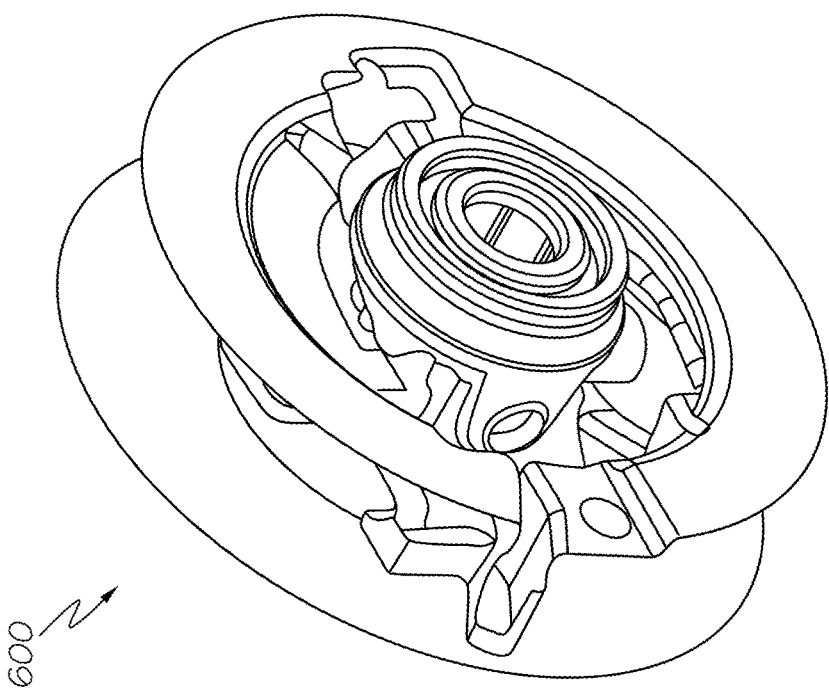
FIG. 6 depicts a perspective view of the mechanical component depicted in the GUI display of FIG. 3 that includes only the unmachined casting feature surfaces of the mechanical component in one exemplary embodiment.

FIGS. 4-7 depict perspective and cross-sectional views of the finished mechanical component 302 depicted in FIG. 3 and the corresponding casted component 400 from which the finished mechanical component 302 is fabricated. In this regard, FIG. 4 depicts the casted component 400 represented by the casting model including all casting feature surfaces, FIG. 5 depicts the machined feature surfaces 500 identified from the finished component model (e.g., task 208), FIG. 6 depicts the subset 600 of casting feature surfaces that are not machined and remain unmodified in the finished component model, and FIG. 7 depicts the subset 700 of machined casting surfaces identified by filtering the unmodified casting feature surfaces of FIG. 6 from the casting feature surfaces depicted in FIG. 4.

Referring to FIGS. 4-7 and with reference to FIGS. 1-3, the processing system 114 and/or design analysis process 200 obtains the casting component model 400 of FIG. 4 and the finished component model 302 of FIG. 3 and compares the two models 302, 400 to distinguish between casting feature surfaces and machined feature surfaces in the finished component model 302. The processing system 114 and/or design analysis process 200 identifies the unmachined casting feature surface subset 600 (e.g., task 206) and filters the unmachined casting feature surface subset 600 from all casting feature surfaces of the casting component model 400 to obtain the filtered subset 700 of machined casting feature surfaces (e.g., task 210). The processing system 114 and/or design analysis process 200 identifies the machined feature surface subset 500 (e.g., task 208) and then determines, for each machined feature surface in the subset 500, the minimum distance between that respective machined feature surface and the representative surface created by combining surfaces of the machined casting feature surface subset 700 (e.g., tasks 212, 214). The resulting machine stock values associated with the respective machined feature surfaces in the subset 500 may be utilized to classify the machined feature surfaces based on a machine stock threshold value (e.g., the input value from text box 306), populate the list boxes 310, 312, 314 of the GUI display 304, and generate user notifications as appropriate (e.g., tasks 216, 218, 220).

By virtue of the subject matter described herein, a designer can readily ascertain the relative amount of machine stock in the casted component and determine which locations of the casted component model should be modified to optimize the machine stock, for example, by minimizing excess machine stock while providing sufficient machine stock across the machined surfaces of the component. Additionally, by filtering out unmodified casting feature surfaces prior to the machine stock measurements, the subject matter described herein ensures that the machine stock measurements are not erroneously attributable to wall thickness or aspects unrelated to machine stock. Intersections between machined feature surfaces and casting surfaces to be machined are identified and handled in a manner that allows the designer to ensure that the machined feature surfaces can be fabricated at those intersecting locations. Thus, by enabling the designer to optimize the casting model, raw material costs may be reduced while manufacturability metrics may also be improved by ensuring compliance with design for manufacturability principles or other fabrication requirements.

As one example, for a machined feature surface corresponding to a wall, wall thickness is typically greater than the machine stock. However, when the wall thickness is less than machine stock, there is risk of measuring wall thickness instead of machine stock. By virtue of the processes described herein filtering unmodified casting feature surfaces and identifying intersecting surfaces, a reliable measurement of machine stock can be obtained when wall thickness is less than machine stock and sufficient machine stock can otherwise be ensured for a machined wall thickness. That said, it will appreciated that the subject matter described herein can be beneficially utilized for any type of machined feature surface.

For the sake of brevity, conventional techniques related to computer-aided design, casting, machining, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The foregoing description may refer to elements or components or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used for the purpose of reference only, and thus are not intended to be limiting. For example, the terms "first," "second," and other such numerical terms referring to structures do not imply a sequence or order unless clearly indicated by the context.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of designing casting hardware, the method comprising:
   filtering, by a processing system, unmodified surfaces in a finished model of a mechanical component from a casting model of a casted component to identify a first subset of surfaces to be machined in the casting model;
   identifying, by the processing system, a second subset of machined feature surfaces in the finished model of the mechanical component;
   creating a representative casting surface to be machined by combining the first subset of surfaces in the casting model into a unitary surface;
   determining, by the processing system, respective machine stock values associated with each machined feature surface of the second subset of machined feature surfaces in the finished model based on a minimum distance between the respective machined feature surface of the second subset and the representative casting surface;
   classifying each machined feature surface of the second subset into one of a plurality of classifications based on a relationship between the respective machine stock value associated with the respective machined feature surface and a machine stock threshold, the plurality of classifications including an excess machine stock category and an insufficient machine stock category; and providing, by the processing system on a display device coupled to the processing system, graphical indicia that the mechanical component may be incapable of being fabricated from the casted component when the respective machine stock value associated with one or more machined feature surfaces of the second subset is less than the machine stock threshold, wherein:

the graphical indicia comprise graphical indicia of the plurality of classifications;

the graphical indicia of the insufficient machine stock category include indicia of the respective one or more machined feature surfaces of the second subset classified into the insufficient machine stock category; and the graphical indicia of the excess machine stock category include indicia of the respective one or more machined feature surfaces of the second subset classified into the excess machine stock category.

2. The method of claim 1, further comprising:

identifying a third subset of unmodified surfaces in the finished model, wherein identifying the first subset comprises filtering the third subset of unmodified surfaces from a plurality of surfaces in the casting model to obtain the first subset of surfaces.

3. The method of claim 2, wherein the filtering comprises:

determining, for each unmodified surface of the third subset, a representative number based on one or more of a surface area of the respective unmodified surface and a center of gravity of the respective unmodified surface;

determining, for each surface of the plurality of surfaces in the casting model, a representative number based on one or more of a surface area of the respective surface and a center of gravity of the respective surface; and excluding one or more surfaces of the plurality of surfaces in the casting model when representative numbers associated with the one or more surfaces match representative numbers associated with one or more unmodified surfaces of the third subset.

4. The method of claim 1, wherein providing the graphical indicia comprises rendering one or more of the machined feature surfaces of the second subset using a visually distinguishable characteristic influenced by a relationship between the respective machine stock values associated with the one or more of the machined feature surfaces and the machine stock threshold.

5. The method of claim 1, wherein providing the graphical indicia comprises generating a user notification when a respective machine stock value associated with one or more of the machined feature surfaces is less than the machine stock threshold.

6. The method of claim 1, further comprising providing, by the processing system, the casting model to a casting system, wherein the casting system fabricates the casting hardware for the casted component based on the casting model.

7. The method of claim 6, further comprising providing, by the processing system, the finished model to a machining system, wherein the machining system fabricates the mechanical component from the casted component based on the finished model.

8. A computer-readable medium having instructions stored thereon that are executable by the processing system of a computing device to perform the method of claim 1.

9. A system comprising:

a display device;

a data storage element to store a finished model of a mechanical component and a casting model of a casted component from which the mechanical component is to be fabricated; and a processing system coupled to the data storage element and the display device to:

identify a first subset of surfaces to be machined in the casting model by filtering unmodified surfaces in the finished model of the mechanical component from the casting model;

identify a second subset of machined feature surfaces in the finished model;

create a representative casting surface to be machined by combining the first subset of surfaces in the casting model into a unitary surface;

determine respective machine stock values associated with each machined feature surface of the second subset based on a minimum distance between the respective machined feature surface of the second subset and the representative casting surface;

classify each machined feature surface of the second subset into one of a plurality of classifications based on a relationship between the respective machine stock value associated with the respective machined feature surface and a machine stock threshold, the plurality of classifications including an excess machine stock category and an insufficient machine stock category; and provide graphical indicia of one or more of the respective machine stock values on the display device, wherein the graphical indicia are influenced by a relationship between the one or more of the respective machine stock values and the machine stock threshold to indicate that the mechanical component may be incapable of being fabricated from the casted component when the respective machine stock value associated with one or more machined feature surfaces of the second subset is less than the machine stock threshold, wherein:

the graphical indicia comprise graphical indicia of the plurality of classifications;

the graphical indicia of the insufficient machine stock category include indicia of the respective one or more machined feature surfaces of the second subset classified into the insufficient machine stock category; and the graphical indicia of the excess machine stock category include indicia of the respective one or more machined feature surfaces of the second subset classified into the excess machine stock category.

10. The system of claim 9, further comprising a user input device coupled to the processing system, wherein the processing system provides a graphical user interface element on the display device to obtain the machine stock threshold via the user input device.

11. The system of claim 9, further comprising a casting system coupled to the processing system to receive the casting model and fabricate casting hardware for the casted component based on the casting model.

12. The system of claim 11, further comprising a machining system coupled to the processing system to receive the finished model and fabricate the mechanical component from the casted component.

13. The system of claim 9, further comprising a machining system coupled to the processing system to receive the finished model and fabricate the mechanical component from the casted component.

14. A computer-implemented method of designing casting hardware to be utilized to form a casted component, the method comprising:
  filtering, by a processing system, a plurality of surfaces of a casting model of the casted component to be formed using the casting hardware to remove unmodified surfaces from the plurality of surfaces to identify a subset of surfaces to be machined in the casting model;
  combining the subset of surfaces in the casting model into a unitary surface to obtain a representative casting surface;
  identifying, by the processing system, a plurality of machined surfaces based on differences between a finished model of a mechanical component to be fabricated from the casted component and the casting model;
  determining, by the processing system, respective minimum distances between the respective machined surfaces of the plurality of machined surfaces and the representative casting surface to obtain a plurality of machine stock values, each machine stock value of the plurality of machine stock values being associated with a respective machined surface of the plurality of machined surfaces;
  classifying each machined surface of the plurality of machined surfaces into one of a plurality of classifications based on a relationship between the respective machine stock value associated with the respective machined surface and a machine stock threshold, the plurality of classifications including an excess machine stock category and an insufficient machine stock category; and
  rendering, by the processing system, one or more of the plurality of machined surfaces classified into the insufficient machine stock category using a visually distinguishable characteristic to indicate the mechanical component may be incapable of being fabricated from the casted component when the respective stock values of the plurality of stock values associated with the one or more of the machined surfaces is less than the machine stock threshold; and
  providing graphical indicia of the plurality of classifications, wherein the graphical indicia of the insufficient machine stock category include indicia of the respective one or more machined surfaces classified into the insufficient machine stock category and the graphical indicia of the excess machine stock category include indicia of the respective one or more machined surfaces classified into the excess machine stock category.

15. The method of claim 14, further comprising identifying the unmodified surfaces in the finished model based on the casting model, wherein the filtering comprises excluding one or more surfaces of the plurality of surfaces when a representative number associated with the one or more surfaces matches a representative number associated with one or more of the unmodified surfaces.

16. The method of claim 1, wherein determining respective machine stock values associated with each machined feature surface comprises:
  determining the respective machine stock value associated with a respective machined feature surface as the minimum distance when the minimum distance is greater than zero; and
  when the minimum distance is equal to zero, determining the respective machine stock value associated with the respective machined feature surface as a minimum distance between the respective machined feature surface and one of the machined feature surfaces of the second subset.

17. The method of claim 1, further comprising providing, by the processing system on the display device, second graphical indicia of excessive machine stock when the respective machine stock value associated with one or more machined feature surfaces of the second subset is greater than the machine stock threshold to facilitate a user adjusting the casting model to minimize excess machine stock.

* * * * *